(12) United States Patent
Tao

(10) Patent No.: US 9,509,866 B2
(45) Date of Patent: Nov. 29, 2016

(54) IMAGE FORMING APPARATUS THAT EXECUTES FAX JOB CONCURRENTLY WITH PRINT JOB WHILE REDUCING DELAY IN FAX JOB PROCESSING, JOB EXECUTION METHOD, AND STORAGE MEDIUM

(71) Applicant: Kyocera Document Solutions Inc., Osaka (JP)

(72) Inventor: Kozo Tao, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/745,380

(22) Filed: Jun. 20, 2015

(65) Prior Publication Data

US 2015/0370510 A1    Dec. 24, 2015

(30) Foreign Application Priority Data

Jun. 20, 2014  (JP) ................. 2014-126843

(51) Int. Cl.
  *G06F 15/00*  (2006.01)
  *H04N 1/00*  (2006.01)
  *G06K 15/02*  (2006.01)

(52) U.S. Cl.
  CPC ...... *H04N 1/00281* (2013.01); *G06K 15/1856* (2013.01)

(58) Field of Classification Search
  CPC ....................................... G06F 3/125
  USPC ....................................... 358/1.15
  See application file for complete search history.

(56) References Cited

U.S. PATENT DOCUMENTS

2001/0015821 A1 *  8/2001  Namizuka ........ G06T 3/40
                                             358/1.15

FOREIGN PATENT DOCUMENTS

JP      2007-026367 A    2/2007

* cited by examiner

*Primary Examiner* — Mark Milia
(74) *Attorney, Agent, or Firm* — James Judge

(57) ABSTRACT

An image forming apparatus includes a processing circuit, a memory, a data reception circuit, a bus, and a transmission amount control circuit. The processing circuit concurrently executes a plurality of jobs including a fax job and a print job. The memory is used for a work area of the processing circuit. The data reception circuit stores the image data received via the communication network in the memory. The bus connects a plurality of modules including the processing circuit and the data reception circuit to the memory. The transmission amount control circuit reduces an amount of data transmission from the data reception circuit to the memory via the bus when the processing circuit executes the print job concurrently with the fax job, compared with a case where the print job is executed concurrently with any job other than the fax job.

5 Claims, 4 Drawing Sheets

FIG. 4

|  | Priority Level |
|---|---|
| Image Input Unit 51 | 5 |
| Image Output Unit 52 | 5 |
| Network I/F 53 | 3 |
| Fax I/F 54 | 3 |
| USB I/F 55 | 3 |
| CPU 59 | 3 |

IMAGE FORMING APPARATUS THAT EXECUTES FAX JOB CONCURRENTLY WITH PRINT JOB WHILE REDUCING DELAY IN FAX JOB PROCESSING, JOB EXECUTION METHOD, AND STORAGE MEDIUM

INCORPORATION BY REFERENCE

This application is based upon, and claims the benefit of priority from, corresponding Japanese Patent Application No. 2014-126843 filed in the Japan Patent Office on Jun. 20, 2014, the entire contents of which are incorporated herein by reference.

BACKGROUND

Unless otherwise indicated herein, the description in this section is not prior art to the claims in this application and is not admitted to be prior art by inclusion in this section.

Generally, there is known an image forming apparatus such as a multi-functional peripheral that is capable of concurrent execution of a plurality of jobs. The jobs include a fax job, which performs a facsimile communication via a telephone network, and a print job, which prints image data received via a communication network other than the telephone network.

SUMMARY

An image forming apparatus according to an aspect of the disclosure includes a processing circuit, a memory, a data reception circuit, a bus, and a transmission amount control circuit. The processing circuit concurrently executes a plurality of jobs including a fax job performing a facsimile communication via a telephone network and a print job printing image data received via a communication network other than the telephone network. The memory is used for a work area of the processing circuit. The data reception circuit stores the image data received via the communication network in the memory. The bus connects a plurality of modules including the processing circuit and the data reception circuit to the memory. The transmission amount control circuit reduces an amount of data transmission from the data reception circuit to the memory via the bus when the processing circuit executes the print job concurrently with the fax job, compared with a case where the print job is executed concurrently with any job other than the fax job.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 4 illustrates exemplary priority levels set to respective modules of the image forming apparatus according to the one embodiment.

DETAILED DESCRIPTION

Figure 1:
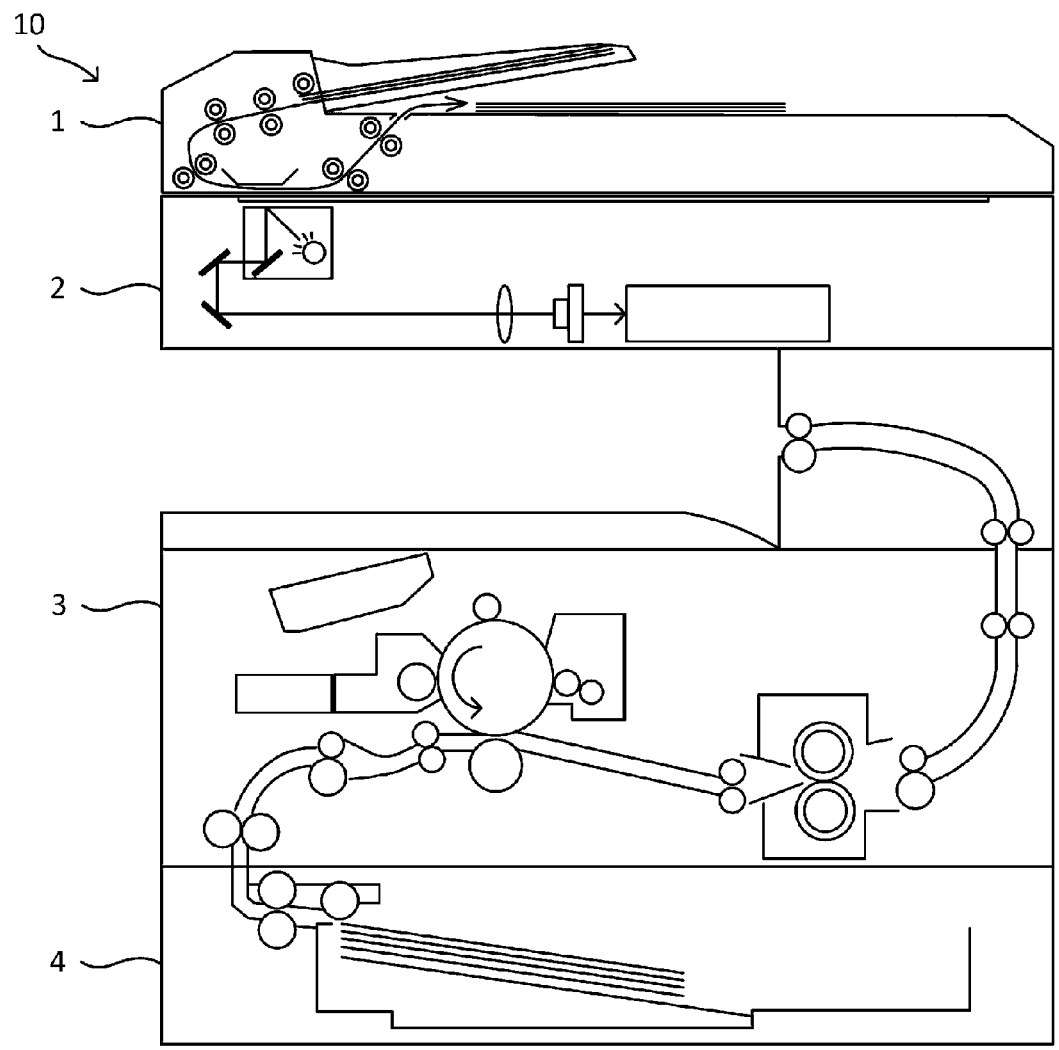
FIG. 1 illustrates a configuration of an image forming apparatus according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Hereafter, a description will be given of the embodiments of the disclosure with reference to the attached drawings, for ease of understanding the disclosure. The following embodiments are merely exemplary embodiments according to the disclosure and not intended to limit the technical scope of the disclosure.

Schematic Configuration of Image Forming Apparatus 10

First, a schematic configuration of an image forming apparatus 10 according to the embodiment of the disclosure will be described with reference to FIGS. 1 and 2. FIG. 1 schematically illustrates a cross section of the image forming apparatus 10.

Figure 2:
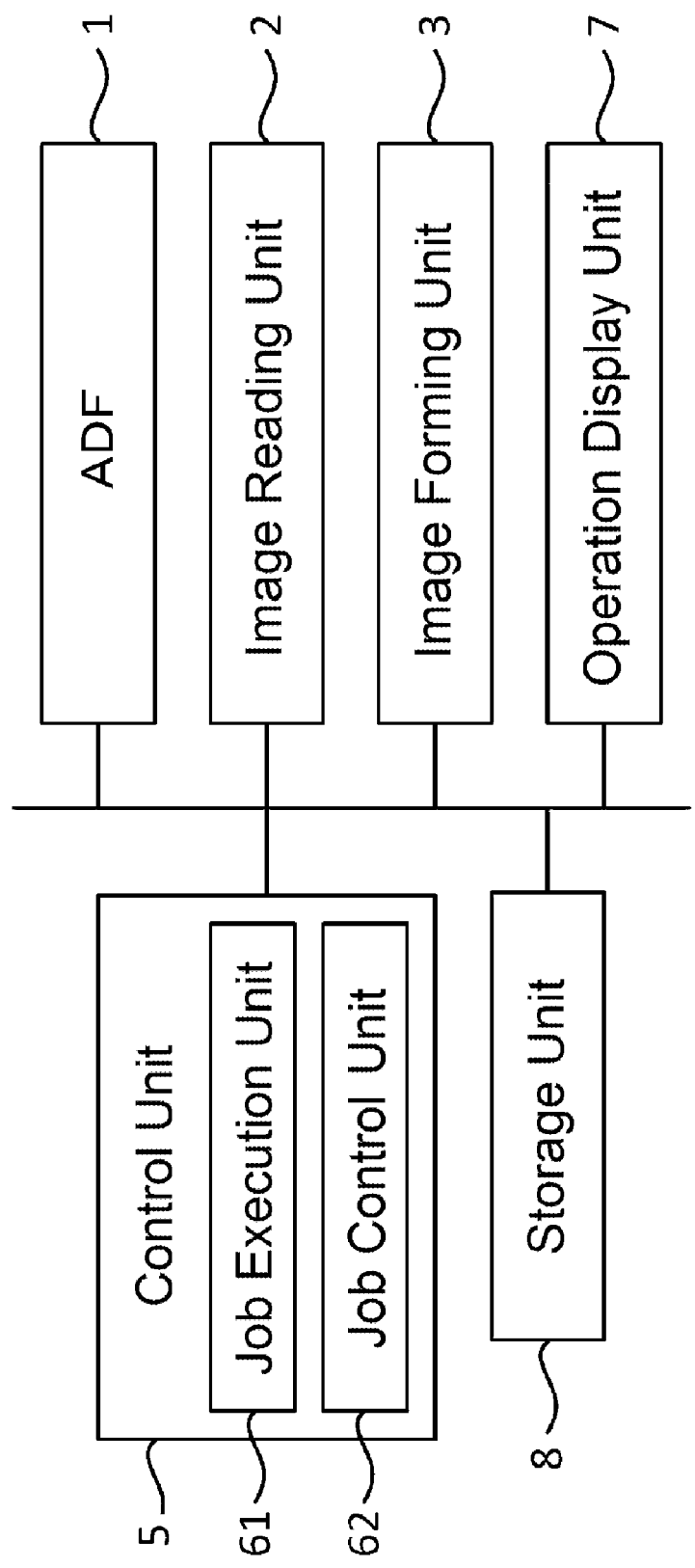
FIG. 2 illustrates a system configuration of the image forming apparatus according to the one embodiment.

As illustrated in FIGS. 1 and 2, the image forming apparatus 10 includes an automatic document feeder (ADF) 1, an image reading unit 2, an image forming unit 3, a paper sheet feeder 4, a control unit 5, an operation display unit 7, and a storage unit 8. The image forming apparatus 10 is a multi-functional peripheral with a plurality of functions such as a scan function, a facsimile function, or a copy function in addition to a printer function forming an image based on image data. The disclosure is applicable to an image forming apparatus such as a printer device, a facsimile device, a copying machine.

The automatic document feeder 1 includes a document setting unit, a plurality of conveyance rollers, a document holder, and a paper sheet discharge unit. The ADF 1 is an automatic document feed that feeds an original document read by the image reading unit 2. The image reading unit 2 includes a platen, a reading unit, a plurality of mirrors, optical lens, and a Charge Coupled Device (CCD). The image reading unit 2 can perform an image reading process that reads the image data from the original document.

The image forming unit 3 can perform an image formation process that forms an image using an electrophotographic method based on the image data read by the image reading unit 2 or the image data inputted from an information processing device such as an external personal computer. Specifically, the image forming unit 3 includes a photoreceptor drum, a charging apparatus, a light scanning device (LSU), a developing device, a transfer roller, a cleaning apparatus, a fixing roller, a pressure roller, and a sheet discharge tray. The image forming unit 3 forms an image on a sheet supplied from the paper sheet feeder 4. The sheet after the image formation is discharged to the sheet discharge tray. The sheet is a sheet material such as a paper, a coated paper, a postcard, an envelope, and an OHP sheet.

The operation display unit 7 includes a display unit such as a liquid crystal display and an operation unit such as an operation key or a touch panel. The display unit displays various kinds of information corresponding to a control instruction from the control unit 5. The operation unit inputs the various kinds of information to the control unit 5 corresponding to a user's operation. The storage unit 8 is a storage device such as a solid state drive (SSD) or a hard disk drive (HDD). The storage unit 8 stores the image data read by the image reading unit 2, or similar data.

Figure 3:
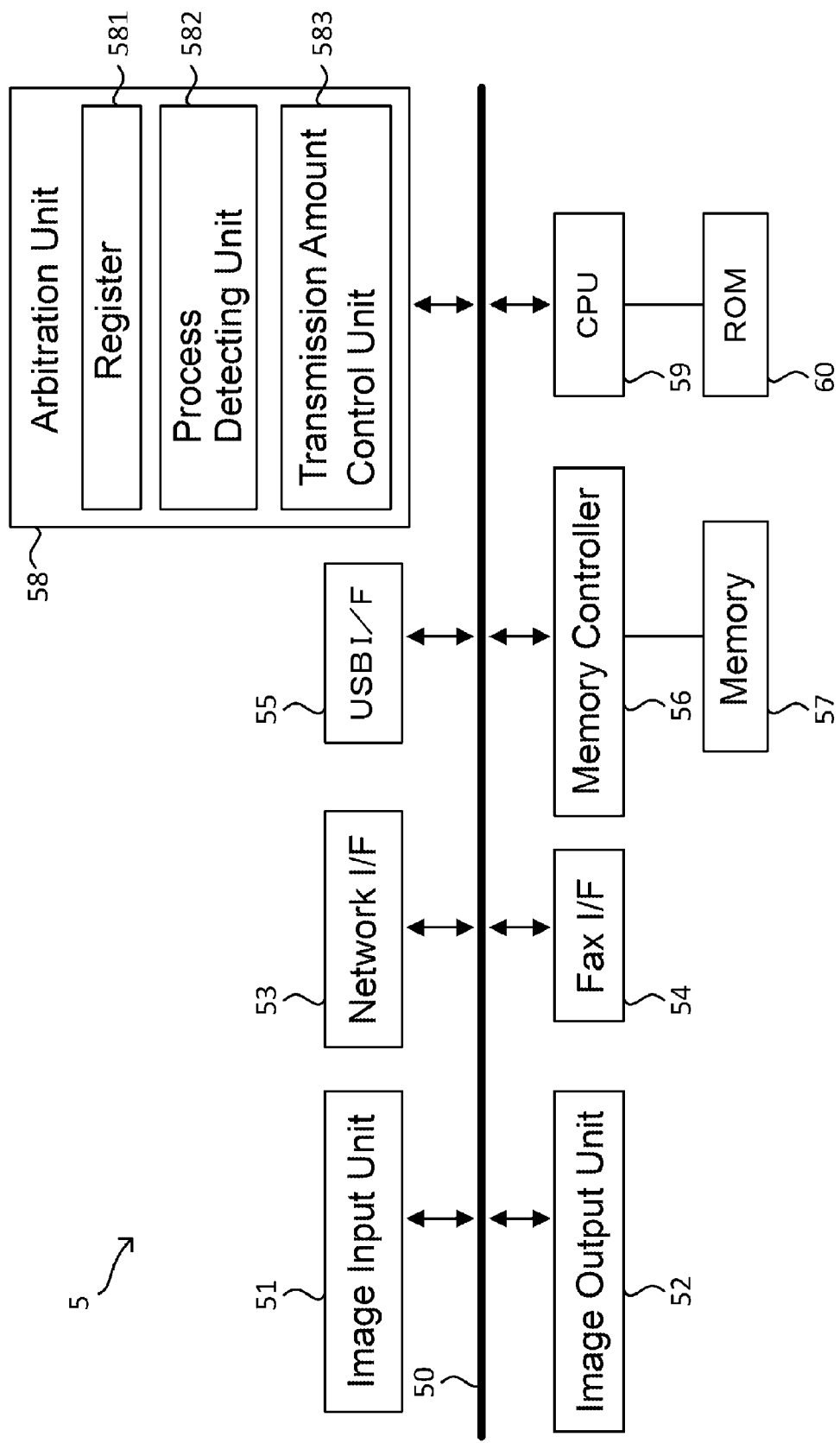
FIG. 3 illustrates a configuration of a control unit of the image forming apparatus according to the one embodiment.

Next, the following describes the control unit 5 with reference to FIG. 3.

The control unit 5 integrally controls respective configurations of the image forming apparatus 10. Specifically, the control unit 5 includes an image input unit 51, an image output unit 52, a network I/F 53, a fax I/F 54, a USB I/F 55, a memory controller 56, a memory 57, an arbitration unit 58, which is also referred to as arbitration circuit, a CPU 59, and a ROM 60, as illustrated in FIG. 3. In the control unit 5, the image input unit 51, the image output unit 52, the network I/F 53, the fax I/F 54, the USB I/F 55, the memory controller 56, the arbitration unit 58, and the CPU 59 are communicatively connected to one another via a bus 50. An exemplary of a plurality of modules of the disclosure includes the image input unit 51, the image output unit 52, the network I/F 53, the fax I/F 54, the USB I/F 55, and the CPU 59, which are connected to the memory 57 via the bus 50. In the following, when it is unnecessary to distinguish these modules, these modules are designated as modules 5X.

The image input unit 51 performs a shading correction process and an image processing such as a gamma correction process for the image data inputted from the charge coupled device of the image reading unit 2. Subsequently, the image input unit 51 stores the image data after image processing into the memory 57 or the storage unit 8.

The image output unit 52 reads the image data from the memory 57, performs the image processing such as a screen process, and then outputs the image data after image processing to the light scanning device of the image forming unit 3.

The network I/F 53 is an interface that communicates with an external information processing device connected via the communication network other than the telephone network. For example, the network I/F 53 receives the image data transmitted from the external information processing device via the communication network to store it in the memory 57. The network I/F 53 is an example of a data reception circuit of the disclosure.

The fax I/F 54 is an interface that performs a facsimile communication with an external facsimile communication apparatus connected via the telephone network. For example, the fax I/F 54 includes a modem that can convert between a digital signal transmitted by the bus 50 and an analog signal transmitted by the telephone network.

The USB I/F 55 includes a USB connection terminal to which an external electronic device capable of input and output of data based on USB standard is connected. For example, a USB flash drive capable of read and write of data based on USB standard is connected to the USB I/F 55.

The memory controller 56 performs read and write processes of the image data with respect to the memory 57 in response to an access request from the respective modules 5X to the memory 57.

The memory 57 is a storage device that is used as a temporary memory (work area) for the various processes performed by the CPU 59. For example, a DDR-SDRAM is employed for the memory 57.

The arbitration unit 58 assigns a bandwidth available in the bus 50 corresponding to a priority level predetermined for each of the modules 5X when the contention for access to the memory 57 via the bus among the plurality of modules 5X occurs.

For the image forming apparatus 10, for example, the priority level classified into five grades are set to the respective modules 5X. The arbitration unit 58 includes a register 581 that stores the priority level set to the respective modules 5X. FIG. 4 illustrates the exemplary priority levels set to the respective modules 5X stored in the register 581. FIG. 4 describes that the larger value the modules 5X set to as the priority level is, the higher priority the access to the memory 57 is. For example, when the contention for access to the memory 57 between the image input unit 51 of priority level 5 and the network I/F 53 of priority level 3 occurs, the arbitration unit 58 assigns the bandwidth available in the bus 50 such that the count of times of data transmission per unit time of the image input unit 51 and the network I/F 53 via the bus 50 is in the ratio 5:3. The set content of the priority level and the assign method of the bandwidth available in the bus 50, which is performed by the arbitration unit 58, may be varied appropriately from the above description such that the fax I/F 54 becomes equal to or better than the network I/F 53 or the USB I/F 55.

When the image reading process is performed in the image reading unit 2, image data for one page of the original document are continuously inputted from the charge coupled device to the image input unit 51. When input speed of the image data from the charge coupled device to the image input unit 51 exceeds the transmission speed of the image data from the image input unit 51 to the memory 57, so-called overflow, as which a part of the image data read by the image reading unit 2 fails to be stored in the memory 57, may occur. When the image formation process is performed in the image forming unit 3, so-called overrun, as which an abnormal image is formed in the image forming unit 3, may occur when output speed of the image data from the image output unit 52 to the light scanning device exceeds the transmission speed of the image data from the memory 57 to the image output unit 52. Therefore, the image input unit 51 and the image output unit 52 among the respective modules 5X are preferably set to the higher priority level than other modules 5X.

The CPU 59 is a processor that performs various arithmetic processings. The ROM 60 is a non-volatile storage device that previously stores information such as control programs to make the CPU 59 perform various processes, that is, a non-transitory computer-readable recording medium. The CPU 59 performs the various control programs previously stored in the ROM 60 to control the image forming apparatus 10 integrally. An exemplary processor of the disclosure includes the CPU 59.

The CPU 59 performs the control programs to function as a job execution unit 61, as illustrated in FIG. 2.

The job execution unit 61 controls the respective modules 5X to execute jobs related to the image processing. Specifically, the plurality of jobs including a scan job, a copy job, a print job, and a fax job are executable in the image forming apparatus 10. The job execution unit 61 can execute the plurality of jobs concurrently.

The scan job is a job that transmits the image data of the original document read by the image reading unit 2 to the external information processing device connected via the communication network. The scan job may also store the read image data in the storage unit 8, the USB flash drive connected to the USB I/F 55, or similar storage. Specifically, the job execution unit 61 mainly controls the image reading unit 2, the image input unit 51, and the network I/F 53 to execute the scan job. The job execution unit 61 performs the image processing such as a compression and decompression process, a rotation process, and a scaling process for the image data stored in the memory 57 based on the execution conditions of the scan job predetermined by a user.

The copy job is a job that makes the image forming unit 3 print the image data of the original document read by the image reading unit 2. Specifically, the job execution unit 61 controls the image reading unit 2, the image forming unit 3, the image input unit 51, and the image output unit 52 to execute the copy job. The job execution unit 61 performs the image processing such as the compression and decompression process, the rotation process, and the scaling process for the image data stored in the memory 57 based on the execution conditions of the copy job predetermined by the user.

The print job is a job that causes the image forming unit 3 to print the image data received from the external information processing communication apparatus connected via the communication network. Specifically, the job execution unit 61 controls the image forming unit 3, the image output unit 52, and the network I/F 53 to execute the print job. The job execution unit 61 performs a communication processing with the external information processing device when performing the print job. The job execution unit 61 further performs the image processing such as the compression and decompression process, a rendering process, the rotation process, and the scaling process for the image data stored in the memory 57 based on the execution conditions of the print job specified by the external information processing device.

The fax job is a job that performs the facsimile communication via the telephone network. The fax job includes a fax transmission job and a fax reception job.

The fax transmission job is a job that transmits the image data of the original document read by the image reading unit 2 to the external facsimile communication apparatus connected via the telephone network. The fax transmission job can also transmit the image data stored in the storage unit 8, or similar unit to the external facsimile communication apparatus. Specifically, the job execution unit 61 mainly controls the image reading unit 2, the image input unit 51, and the fax I/F 54 to execute the fax transmission job. The job execution unit 61 performs a facsimile communication processing with the external facsimile communication apparatus when performing the fax transmission job. The job execution unit 61 further performs the image processing such as the compression and decompression process, the rotation process, and the scaling process for the image data stored in the memory 57 based on the execution conditions of the fax transmission job determined by the external facsimile communication apparatus.

The fax reception job is a job that includes a reception process and a printing process. The reception process is a process for receiving the image data from the external facsimile communication apparatus connected via the telephone network. The printing process is a process for causing the image forming unit 3 to print the image data received by the reception process. The fax reception job can also store the image data received by the reception process in the storage unit 8, or similar unit. Specifically, the job execution unit 61 mainly controls the image forming unit 3, the image output unit 52, and the fax I/F 54 to execute the fax reception job. The job execution unit 61 performs a facsimile communication processing with the external facsimile communication apparatus when performing the reception process. The job execution unit 61 further performs the image processing such as the compression and decompression process for the image data stored in the memory 57 when performing the reception process.

In the image forming apparatus 10, when the fax job is executed concurrently with the print job by the CPU 59, a delay in the fax job processing and an increase of the telephone network usage fee may occur compared with the case where the fax job is executed concurrently with any other job. Specifically, the image processing such as the rendering process performed by the print job is more likely to cause a heavy process load applied to the CPU 59 and the delay in the fax job processing compared with the image processing performed by other jobs. In response to this situation, the image forming apparatus 10 can execute the fax job concurrently with the print job while reducing the delay in the fax job processing, as described below.

Specifically, the arbitration unit 58 in the image forming apparatus 10 includes a process detecting unit 582 and a transmission amount control unit 583. For example, the process detecting unit 582 and the transmission amount control unit 583 in the arbitration unit 58 are constituted of an electronic circuit that is capable of performing the predetermined process. The transmission amount control unit 583 is also referred to as transmission amount control circuit.

The process detecting unit 582 detects a concurrent processing of the print job and the fax job performed by the job execution unit 61. For example, the process detecting unit 582 parses a request for permission to use of the bus 50 from the respective modules 5X to the arbitration unit 58 to detect the concurrent processing of the print job and the fax job. An exemplary first step of the disclosure includes the process performed by the process detecting unit 582.

When the concurrent processing of the print job and the fax job is detected by the process detecting unit 582, the transmission amount control unit 583 reduces an amount of data transmission from the network I/F 53 to the memory 57 via the bus 50 compared with the case where the print job is executed concurrently with any job other than the fax job. Accordingly, an amount of data of the image data for the rendering process decreases, which results in the reduced process load applied to the CPU 59. Therefore, the delay in the image processing performed by the fax job is reduced. An exemplary second step of the disclosure includes the process performed by the transmission amount control unit 583.

Specifically, the transmission amount control unit 583 modifies the set content of the priority level for the network I/F 53 stored in the register 581 to lower the priority level corresponding to the network I/F 53. For example, for the example illustrated in FIG. 4, the network I/F 53 may be set to the priority level of 3 to 1. It has been observed that the transmission amount control unit 583 controls the upper limit of the amount of data transmission per unit time of the network I/F 53 via the bus 50 to reduce the amount of data transmission from the network I/F 53 to the memory 57. The degree of reduction of the amount of data transmission from the network I/F 53 to the memory 57 may be set appropriately, taking the degree of delay of the image processing into account. This image processing is performed by the fax job where the print job is executed concurrently with the fax job.

When the concurrent processing of the print job and the fax reception job is detected by the process detecting unit 582, the transmission amount control unit 583 reduces the amount of data transmission from the network I/F 53 to the memory 57 via the bus 50 only during a period until the completion of the reception process of the fax reception job. This enables to prioritize the execution of the fax reception job only during the period of the reception process for which the telephone network usage fee is charged.

On the other hand, the CPU 59 performs the control programs to function also as a job control unit 62, as illustrated in FIG. 2.

When the fax transmission job execution is initiated by the job execution unit 61 during the print job running, the job control unit 62 keeps the job execution unit 61 waiting for the fax transmission job execution during a period until the completion of the image processing for the unprocessed image data that is transmitted from the network I/F 53 and stored in the memory 57. As a result, the processing capabilities of the CPU 59 are occupied by the rendering process for the unprocessed image data stored in the memory 57 when the fax transmission job execution is initiated. Accordingly, the delay in the image processing performed by the fax transmission job is reduced.

Thus, when the print job is executed concurrently with the fax job, the image forming apparatus 10 reduces the amount of data transmission from the network I/F 53 to the memory 57 via the bus 50. This results in the reduced process load applied to the CPU 59 due to the rendering process performance. Therefore, one processing circuit can execute the fax job concurrently with the print job while reducing the delay in the fax job processing.

In the image forming apparatus 10, the arbitration unit 58 detects the concurrent processing of the print job and the fax job to reduce the amount of data transmission from the network I/F 53 to the memory 57 via the bus 50. Accordingly, the disclosure may be implemented without burdening the CPU 59 with the additional processes. Additionally, it is unnecessary to change processing items of the CPU 59 when implementing the disclosure. In the image forming apparatus 10, another embodiment may include a configuration where the CPU 59 performs the control programs to function as the process detecting unit 582 and the transmission amount control unit 583.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus data-communicatively connectable to a telephone network and to a non-telephonic communications network, and enabled for carrying out image-forming jobs of a plurality of kinds, comprising:
 a processing circuit for concurrently executing a plurality of jobs including a fax job in which facsimile data reception via the telephone network is carried out by the image forming apparatus, and a print job in which image data received via the non-telephonic communications network is printed by the image forming apparatus;
 a memory used for a work area of the processing circuit;
 a data reception circuit for storing image data received via the non-telephonic communications network in the memory;
 a bus connecting a plurality of modules of the image forming apparatus, including the processing circuit and the data reception circuit, to the memory; and
 an arbitration circuit including a register storing bus-bandwidth priority levels assigned to each of the modules, and a transmission amount control circuit for reducing amount of data transmission from the data reception circuit to the memory via the bus when the processing circuit executes a print job concurrently with a fax data reception job, compared with a case where the print job is executed concurrently with any job other than the fax job, by lowering the bus-bandwidth priority level assigned to the data reception circuit.

2. The image forming apparatus according to claim 1, wherein:
 the fax job includes a fax transmission job transmitting the image data via the telephone network; and
 the processing circuit keeps the fax transmission job on standby during a period until an image processing for unprocessed image data transmitted from the data reception circuit and stored in the memory is completed when the fax transmission job execution is initiated during the print job running.

3. The image forming apparatus according to claim 1, wherein:
 the fax job includes a printing process of printing the image data received by the reception process; and
 the transmission amount control circuit reduces amount of data transmission from the data reception circuit to the memory via the bus only during a period until completion of the reception process.

4. A job execution method comprising:
 preparing an image forming apparatus, data-communicatively connectable to a telephone network and to a non-telephonic communications network, and enabled for carrying out image-forming jobs of a plurality of kinds, that includes
 a processing circuit for concurrently executing a plurality of jobs including a fax job in which facsimile data reception via the telephone network is carried out by the image forming apparatus, and a print job in which image data received via the non-telephonic communications network is printed by the image forming apparatus,
 a memory used for a work area of the processing circuit,
 a data reception circuit for storing image data received via the non-telephonic communications network in the memory,
 a bus connecting a plurality of modules of the image forming apparatus, including the processing circuit and the data reception circuit, to the memory, and
 an arbitration circuit including a register storing bus-bandwidth priority levels assigned to each of the modules;
 detecting concurrent print-job and fax-job processes being carried out by the processing circuit; and
 reducing amount of data transmission from the data reception circuit to the memory via the bus when the processing circuit executes a print job concurrently with a fax data reception fax job, compared with a case where the print job is executed concurrently with any job other than the fax job, by lowering the bus-bandwidth priority level assigned to the data reception circuit.

5. A non-transitory computer-readable recording medium storing a job execution program to control an image forming apparatus data-communicatively connectable to a telephone network and to a non-telephonic communications network, and enabled for carrying out image-forming jobs of a plurality of kinds, the job execution program causing the image forming apparatus to function as:
- a processing circuit for concurrently executing a plurality of jobs including a fax job in which facsimile data reception via the telephone network is carried out by the image forming apparatus, and a print job in which image data received via the non-telephonic communications network is printed by the image forming apparatus;
- a memory used for a work area of the processing circuit;
- a data reception circuit for storing image data received via the non-telephonic communications network in the memory;
- a bus connecting a plurality of modules of the image forming apparatus, including the processing circuit and the data reception circuit, to the memory; and
- an arbitration circuit including a register storing bus-bandwidth priority levels assigned to each of the modules, and a transmission amount control circuit for reducing amount of data transmission from the data reception circuit to the memory via the bus when the processing circuit executes a print job concurrently with a fax data reception job, compared with a case where the print job is executed concurrently with any job other than the fax job, by lowering the bus-bandwidth priority level assigned to the data reception circuit.

* * * * *